United States Patent
Knowles et al.

(10) Patent No.: US 12,276,782 B2
(45) Date of Patent: Apr. 15, 2025

(54) OPTICAL MICROSCOPY

(71) Applicant: Cambridge Enterprise Limited, Cambridge (GB)

(72) Inventors: Tuomas Pertti Jonathan Knowles, Cambridge (GB); Pavan Kumar Challa, Cambridge (GB); Kadi Liis Saar, Cambridge (GB); Quentin Alexis Peter, Cambridge (GB); Zenon Toprakcioglu, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 89 days.

(21) Appl. No.: 17/296,212

(22) PCT Filed: Nov. 22, 2019

(86) PCT No.: PCT/GB2019/053304
§ 371 (c)(1),
(2) Date: May 21, 2021

(87) PCT Pub. No.: WO2020/104813
PCT Pub. Date: May 28, 2020

(65) Prior Publication Data
US 2022/0011560 A1  Jan. 13, 2022

(30) Foreign Application Priority Data
Nov. 22, 2018 (GB) .................................... 1819029
Sep. 19, 2019 (GB) .................................... 1913536

(51) Int. Cl.
*G02B 21/00* (2006.01)
*G01N 21/45* (2006.01)
(Continued)

(52) U.S. Cl.
CPC ......... *G02B 21/0056* (2013.01); *G01N 21/45* (2013.01); *G01N 21/4795* (2013.01); *G02B 21/14* (2013.01); *G02B 21/361* (2013.01)

(58) Field of Classification Search
CPC .. G02B 21/0056; G02B 21/14; G02B 21/361; G01N 21/45; G01N 21/4795; G01B 9/02057
See application file for complete search history.

(56) References Cited

U.S. PATENT DOCUMENTS 4,096,745 A  6/1978  Rivkin et al.
4,999,681 A * 3/1991  Mader ............... G01B 9/021
                                        359/22
(Continued)

FOREIGN PATENT DOCUMENTS

CN  112511062 A  3/2021
EP  3 276 389 A1  1/2018
(Continued)

OTHER PUBLICATIONS

Dominic Ruh, Julius Mutschler, Moritz Michelbach, and Alexander Rohrbach, "Superior contrast and resolution by image formation in rotating coherent scattering (ROCS) microscopy," Optica 5, 1371-1381 (Oct. 2018) (Year: 2018).*
(Continued)

*Primary Examiner* — Uzma Alam
*Assistant Examiner* — Jonathon Cook
(74) *Attorney, Agent, or Firm* — Wolf, Greenfield & Sacks, P.C.

(57) ABSTRACT

A method of increasing the interference contrast in interferometric scattering optical microscopy. The method comprises providing a particle detection region comprising a chamber or channel having a boundary defined by one or more interfaces, illuminating a particle in the particle detec-
(Continued)

tion region with coherent light using an objective lens such that the light is reflected from the interface and scattered by the particle, capturing the reflected light and the scattered light using the objective lens, and providing the captured reflected and scattered light to an imaging device to image interference between the reflected light and the scattered light. The particle is illuminated by coherent light at an oblique angle to the interface.

18 Claims, 9 Drawing Sheets

(51) Int. Cl.
  *G01N 21/47* (2006.01)
  *G02B 21/14* (2006.01)
  *G02B 21/36* (2006.01)

(56) References Cited

U.S. PATENT DOCUMENTS

| | | | |
|---|---|---|---|
| 2005/0128488 A1* | 6/2005 | Yelin | G01B 11/2509 |
| | | | 356/496 |
| 2005/0145496 A1 | 7/2005 | Goodsaid et al. | |
| 2012/0218629 A1 | 8/2012 | Winterot et al. | |
| 2012/0301967 A1 | 11/2012 | Nadkarni | |
| 2014/0376816 A1 | 12/2014 | Lagae et al. | |
| 2017/0248518 A1 | 8/2017 | Nadkarni et al. | |
| 2017/0307509 A1 | 10/2017 | Boccara et al. | |
| 2018/0136114 A1 | 5/2018 | Delattre et al. | |
| 2018/0143418 A1 | 5/2018 | Kapanidis et al. | |
| 2018/0275097 A1 | 9/2018 | Sandoghdar et al. | |
| 2019/0004299 A1* | 1/2019 | Kukura | G02B 21/008 |
| 2022/0012456 A1 | 1/2022 | Knowles et al. | |
| 2022/0026251 A1 | 1/2022 | Van Groenestijn et al. | |
| 2023/0288307 A1 | 9/2023 | Peter et al. | |

FOREIGN PATENT DOCUMENTS

| | | |
|---|---|---|
| JP | 2017-075958 A | 4/2017 |
| WO | WO 02/086578 A2 | 10/2002 |
| WO | WO 2015/059682 A1 | 4/2015 |
| WO | WO 2017/041809 A1 | 3/2017 |
| WO | WO 2017/136664 A1 | 8/2017 |
| WO | WO 2018/011591 A1 | 1/2018 |
| WO | WO 2018/047239 A1 | 3/2018 |
| WO | WO 2018/189187 A1 | 10/2018 |
| WO | WO 2018/190162 A1 | 10/2018 |
| WO | WO 2020/104813 A1 | 5/2020 |
| WO | WO 2020/104814 A2 | 5/2020 |

OTHER PUBLICATIONS

Direct Observation and Control of Supported Lipid Bilayer Formation with Interferometric Scattering Microscopy Joanna Andrecka, Katelyn M. Spillane, Jaime Ortega-Arroyo, and Philipp Kukura ACS Nano 2013 7 (12), 10662-10670 DOI: 10.1021/nn403367c (Year: 2013).*
Shwetadwip Chowdhury, Al-Hafeez Dhalla, and Joseph Izatt, "Structured oblique illumination microscopy for enhanced resolution imaging of non-fluorescent, coherently scattering samples," Biomed. Opt. Express 3, 1841-1854 (2012) (Year: 2012).*
Philipp von Olshausen and Alexander Rohrbach, "Coherent total internal reflection dark-field microscopy: label-free imaging beyond the diffraction limit," Opt. Lett. 38, 4066-4069 (2013) (Year: 2013).*
International Search Report and Written Opinion for International Application No. PCT/EP2021/068359 mailed Oct. 18, 2021.
British Search Report for Great Britain Application No. 2010411.3 dated Dec. 22, 2020.
Peter et al., Interferometric Scattering Correlation (ISCORR) Microscopy. Co-pending U.S. Appl. No. 18/014,701, filed Jan. 5, 2023.
Strack, Scattering microscopy takes single-particle tracking to the next level. Nature Methods. Jun. 2019;16(6):455.
Taylor et al., Interferometric scattering microscopy: seeing single nanoparticles and molecules via Rayleigh scattering. Nano letters. Jul. 17, 2019;19(8):4827-35.
Knowles et al., Particle Characterization Using Optical Microscopy. Co-pending U.S. Appl. No. 17/296,208, filed May 21, 2021.
International Search Report and Written Opinion for International Application No. PCT/GB2019/053304, mailed Feb. 26, 2020.
International Preliminary Report on Patentability for International Application No. PCT/GB2019/053304, mailed Jun. 3, 2021.
International Search Report and Written Opinion for International Application No. PCT/GB2019/053305, mailed Jun. 24, 2020.
International Preliminary Report on Patentability for International Application No. PCT/GB2019/053305, mailed Jun. 3, 2021.
Andrecka et al., Direct observation and control of supported lipid bilayer formation with interferometric scattering microscopy. ACS Nano. Dec. 23, 2013;7(12):10662-70.
Arroyo et al., Interferometric scattering microscopy and its combination with single-molecule fluorescence imaging. Nature Protocols. Apr. 2016;11(4):617-33.
Cole et al., Label-free single-molecule imaging with numerical-aperture-shaped interferometric scattering microscopy. ACS Photonics. Feb. 15, 2017;4(2):211-6.
Goldfain et al., Dynamic measurements of the position, orientation, and DNA content of individual unlabeled bacteriophages. The Journal of Physical Chemistry B. Jul. 7, 2016;120(26):6130-8.
Kamholz et al., Quantitative analysis of molecular interaction in a microfluidic channel: the T-sensor. Analytical Chemistry. Dec. 1, 1999;71(23):5340-7.
Koch et al., Label-free imaging and bending analysis of microtubules by ROCS microscopy and optical trapping. Biophysical Journal. Jan. 9, 2018;114(1):168-77.
Konopka et al., Variable-angle epifluorescence microscopy: a new way to look at protein dynamics in the plant cell cortex. The Plant Journal. Jan. 2008;53(1):186-96.
Liebel et al., Ultrasensitive label-free nanosensing and high-speed tracking of single proteins. Nano Letters. Feb. 8, 2017;17(2):1277. Abstract and Supporting Information only.
Pache et al., Dark-field optical coherence microscopy. Proc. SPIE 7554: Optical Coherence Tomography and Coherence Domain Optical Methods in Biomedicine XIV. Feb. 19, 2010;7554:755425.
Piliarik et al., Direct optical sensing of single unlabelled proteins and super-resolution imaging of their binding sites. Nature Communications. Jul. 29, 2014;5(1):1-8.
Yang et al., Direct observation of λ-DNA molecule reversal movement within microfluidic channels under electric field with single molecule imaging technique. Chinese Physics B. May 31, 2016;25(7):078201.
Examination Report for European Application No. 19809897.2, dated Oct. 20, 2023.
Miller et al., Single-molecule techniques in biophysics: a review of the progress in methods and applications. Reports on Progress in Physics. Dec. 19, 2017;81(2):024601.
Sharma et al., Single positively charged particle trapping in nanofluidic systems. Microelectronic Engineering. May 5, 2017;175:43-9.
Kukura et al., High-speed nanoscopic tracking of the position and orientation of a single virus. Nature methods. Dec. 2009;6(12):923-7.
Mojarad et al., Measuring the size and charge of single nanoscale objects in solution using an electrostatic fluidic trap. Nature Nanotechnology. Jul. 2012;7:448-52.
Taylor et al., Interferometric scattering microscopy reveals microsecond nanoscopic protein motion on a live cell membrane. Nature Photonics. Jul. 2019;13:480-7.

* cited by examiner

OPTICAL MICROSCOPY

CROSS REFERENCE TO RELATED APPLICATIONS

This Application is a national stage filing under 35 U.S.C. § 371 of International Patent Application Serial No. PCT/GB2019/053304, filed Nov. 22, 2019, which claims priority to British application number 1819029.8, filed Nov. 22, 2018, and claims priority to British application number 1913536.7, filed Sep. 19, 2019. The contents of these applications are incorporated herein by reference in their entirety.

FIELD

This invention relates to generally to interferometric scattering optical microscopy.

The work leading to this invention has received funding from the European Research Council under the European Union's Seventh Framework Programme (FP7/2007-2013)/ERC grant agreement no 337969. The project leading to this application has received funding from the European Union's Horizon 2020 research and innovation programme under grant agreement No 766972. The project leading to this application has received funding from the European Union's Horizon 2020 research and innovation programme under the Marie Sklodowska-Curie grant agreement No 674979.

BACKGROUND

Interferometric scattering optical microscopy (iSCAT) is a technique in which an imaged particle is illuminated with coherent light and the signal results from interference between light scattered from the particle and a reference light reflected from a nearby interface. This interference can result in signals which are amplified compared with some other approaches, and the technique is capable of label-free detection of single molecules, such as biological molecules for example proteins/protein complexes. However the interference signal can be very small and difficult to detect and typically the iSCAT setup creates a spurious reflection that limits the achievable signal-to-noise ratio.

In more detail, the iSCAT signal can be separated into three components, the reflected laser intensity, the scattered intensity, and the interference between the two. The reflected laser intensity is dominant but does not carry any information, the scattered intensity is too weak to detect, and only the interference is useful.

As described in Arroyo et al, "Interferometric scattering microscopy and its combination with single-molecule fluorescence imaging," Nature protocols, vol. 11, no. 4, p. 617, 2016, "The alignment of the illumination beam is critical to the final image quality. Therefore to ensure proper alignment, it is imperative that the [illuminating] beam travels straight through the objective along its optical axis". However this arrangement causes a problem in that despite using very high quality antireflection coatings a small fraction of the incident light is reflected from the back of the objective lens. As the illuminating laser has a short coherence length, of order hundreds of microns for a laser diode, this spurious reflection can reduce the signal to noise ratio and contrast by an order of magnitude. However use of a "long coherence length leads to interference of almost any reflections within the experimental setup, resulting in additional imaging noise" (ibid).

One way of increasing the contrast is described in Cole et al., "Label-Free Single-Molecule Imaging with Numerical-Aperture-Shaped Interferometric Scattering Microscopy" ACS Photonics 2017 4(2), 211-216, and also in WO2018/011591. This uses a partially transmissive phase mask which reduces the background light intensity reaching the detector thereby increasing the interferometric contrast. A broadly similar technique involving a partially transmissive mask is described in Liebel et al., "Ultrasensitive Label-Free Nano-sensing and High-Speed Tracking of Single Proteins", Nano Letters 2017, 17(2), 1277-1281.

However these techniques have disadvantages, for example image fringe artefacts and distortion; they may also enhance the relative background from surface roughness of the interface. Counter-intuitively, using a phase mask as described by Cole et al. improves the contrast but does not change the signal to noise ratio (this is because the signal is interferometric). Thus whilst the technique may help if the microscope is limited by the camera frame rate, and may facilitate focusing, it does not improve the signal to noise ratio which is the crucial parameter.

Further background prior art can be found in Goldfain et al. "Dynamic measurements of the position, orientation, and DNA content of individual unlabeled bacteriophages," Journal of Phys. Chem. B, vol. 120(26), pp. 6130-6138, 2016; WO2017/041809; WO2015/059682; WO2018/189187; WO2018/047239; US2012/218629; and Konopka et al. "Variable-angle epifluorescence microscopy: a new way to look at protein dynamics in the plant cell cortex" Plant Journal, vol. 53(1), pp. 186-196, 2008.

SUMMARY

In one aspect there is therefore described a method of increasing the (interference) signal contrast in interferometric scattering optical microscopy. The method may comprise providing a particle detection region having a boundary defined by one or more interfaces. The particle detection region may comprise a chamber or channel, or the particle detection region may comprise a droplet of liquid on an optically transmissive surface such as a coverslip. The method may further comprise illuminating a particle in the particle detection region with coherent light using an objective lens such that the light is reflected from the interface and scattered by the particle. The method may further comprise capturing the reflected light and the scattered light using the objective lens. The method may further comprise providing the captured reflected and scattered light to an imaging device to image interference between the reflected light and the scattered light. The objective lens may have an optical axis. The imaging device may comprise imaging optics and, i.e. followed by in an optical path, a detector.

In implementations the method further comprises providing the coherent light at an oblique angle to the interface, to illuminate the particle. Thus the method may further comprise providing the coherent light to the objective lens off-axis, i.e. offset from the optical axis of the objective lens. The coherent light, e.g. laser light or light from a narrow-band LED source, may be provided to the objective lens in a direction parallel to and offset from the optical axis.

Thus in implementations rather than being normal to the interface the light illuminating the particle comprises a collimated beam at an oblique angle to the interface. Expressed differently, an angle of incidence between the beam and a normal to the interface is greater than 0 degrees and less than 90 degrees; if the beam is not precisely collimated the average angle of incidence may be greater than zero degrees. In implementations the angle of incidence is less than a critical angle at the interface.

Thus in implementations the coherent light provided at an oblique angle to the interface comprises a parallel or collimated beam. The beam may be collimated by the objective lens; thus the coherent light may be focused at a back focal plane of the objective lens. The coherent light may be propagated along an axis parallel to the optical axis of the objective lens, e.g. the laser light may be aligned parallel to but offset from the optical axis of the objective lens. By contrast the reflected and scattered light is captured in a direction along the optical axis of the objective lens.

In some implementations an angle of incidence of the coherent light at the interface may be greater than an angle value at which, at the imaging device, an intensity of the reflected light is greater than an intensity of light reflected from a back surface of the objective lens. The angle of incidence may be less than this angle value plus 5, 10, or 20 degrees. For example the angle of incidence in the range 1-30, 3-20 or 5-15 degrees, e.g. around 10 degrees.

It is not essential that the coherent light is focused precisely on a back focal plane of the objective, and the technique will work when the light illuminating the particle is not precisely collimated.

These techniques can hugely improve the signal to noise ratio, and also the interference pattern image contrast. In implementations the spurious reflection from the back of the objective lens can be substantially eliminated, only collecting the interfering reflection. Whilst the laser is focused on the back focal plane it is off-axis; the distance of the laser axis to the optical axis of the objective lens changes the angle of incidence of the light from the objective. The spurious reflection from the back of the objective is thus not reflected directly back into the camera. This inhibits the spurious reflection from reaching the camera and so that it does not reduce the signal to noise ratio; instead mainly or only the interfering reflection e.g. from a glass-water interface of the microscope, is collected. In broad terms by illuminating at an oblique angle to the scattered light the background reflected signal level can be reduced, increasing the signal-to-noise ratio as well as the interference contrast. The intensity of the light reflected from the interface depends on angle (as expected from Snell's law), but the signal to noise ratio does not. At normal incidence, however, there is an additional contribution from the spurious reflection which substantially reduces the signal to noise.

In some implementations a rear surface of the objective lens is curved e.g. domed, rather than flat. In this case further benefit may be obtained as the spurious reflection is at a slight angle to the incoming light. This deflects the spurious reflection e.g. away from the subsequent optics/imaging device e.g. into the walls of the detector.

Some implementations of this technique are particularly, but not exclusively, suitable for imaging particles in solution, e.g. aqueous solution. The particles may comprise molecules or molecular complexes, such as biological molecules/complexes, e.g. proteins, protein complexes, or antibodies. More generally the particles may have a maximum dimension which is less than a wavelength of the coherent light, or less than half this wavelength. Such particles may include metallic or other nanoparticles, colloid particles, polymer particles, viruses, exosomes and other extra-cellular vesicles, proteins, and bio-particles in general.

As described later, in implementations the particles may be illuminated at the oblique angle using polarised light close to the Brewster's angle, through the objective lens, to collect the interference light, thereby reducing the background reflected signal level and increasing the interference contrast. Whilst illuminating at an oblique angle can reduce the level of scattered light captured by the objective lens in the on-axis direction, overall the contrast can be improved.

With very large oblique angles (to the optical axis) the signal-to-noise ratio can again diminish. The method may therefore comprise adjusting the oblique angle to maximize a signal-to-noise ratio of the interference between the reflected light and the scattered light i.e. to maximize the interference contrast. The interference contrast may be determined at the output of the imaging device, that is from the captured image of the interference. This is because as the response of the imaging device, such as its sensitivity/inherent noise level, can also affect this trade-off. The imaging device may be a 1D or 2D imaging device, for example a camera. The optimum angle may also depend on the surface roughness of the interface.

As the angle of incidence increases away from 0 degrees, i.e. as the illumination becomes more oblique, the effect of the spurious reflection from the back of the objective lens gets less but the interference pattern becomes more distorted. In some implementations, therefore, the oblique angle is selected so that the intensity of the light from the spurious reflection(s) is equal to or less than the intensity of the light reflected from the interface of the chamber or channel (as measured at the imaging device), but not substantially greater than this value e.g. not more than 10, 20 or 30 degrees greater than this value.

One way to improve the interference contrast without needing such an oblique angle, and hence with less reduction in scattered return, is to polarize the illuminating coherent light. More particularly, in some implementations the method further comprises linearly polarizing the coherent light such that its electric field vector is partially or completely p-polarized with respect to a plane of incidence of the coherent light on the interface.

The angle of illumination may then further be adjusted so that it is close to Brewster's angle for the interface at the illuminating wavelength, although it may not be precisely at Brewster's angle since some reflected light is needed for the interference (though as the laser is typically not perfectly collimated there is still some reflection even if exactly at Brewster's angle). For example the angle of illumination may be substantially Brewster's angle, i.e. it may be sufficiently close to Brewster's angle that the reflectance of the interface for the coherent light is less than 10%, 1% or 0.1%, or so that the intensity of the reflected light is larger than scattered light.

Also or instead a spatial filter or mask may be used to increase the interference pattern contrast, in particular by changing the intensity of the reflected light. The spatial filter or mask may be located at a focal plane of the microscope, more particularly at a focal plane of the captured reflected and scattered light e.g. at a back focal plane or Fourier plane of the objective lens.

In implementations the reflected light is offset from the optical axis of the objective lens in an opposite direction to the offset (from the optical axis) of the optical path of the coherent light to the objective lens. Thus the spatial filter may be off-axis e.g. configured to selectively mask a region of the Fourier plane offset from the optical axis, and may be asymmetrical about the optical axis leaving the illuminating coherent light and/or an on-axis region of the back focal plane unmasked. Typically the centre of the Fourier plane on/around the optical axis contains important information relating to the desired interference signal, and implementations of the method facilitate spatial filtering away from this location in a less important part of the Fourier plane. In general the mask may be of low but non-zero transmittance.

In implementations the spatial mask reduces an intensity of both the reflected light and the noise and therefore may leave the signal to noise ratio relatively unchanged (see later for a more detailed discussion). However reducing the reflected light intensity can increase the contrast—because the signal is interferometric, the signal-to-noise ratio and contrast are somewhat decoupled from one another.

The iSCAT technique relies on interference between the reflected and scattered light, and these overlap at the detector (imaging device), where an interference pattern is formed. At the back focal plane of the objective the scattered light is spread across the back focal plane but the reflected light is brought to a focus at a specific location (although it is spread across the detector because there is a Fourier transform between the back focal plane and the detector). At this specific location on the back focal plane of the objective a mask can selectively attenuate the reflected light.

Thus in some implementations the mask (spatial filter) may be small, e.g. corresponding to a size of the focal spot of the laser (e.g. full width at half-maximum), to reduce information loss. The mask may be disc-shaped. The mask may be partially-transmissive, as described later e.g. blocking more than 50%, 75%, 90%, or 94% of the light incident on the mask but less than 100%, 99% or 95% of the light e.g. blocking around 99% of the light.

In some implementations the mask may be provided on a substantially transparent support. If the back focal plane is not accessible the mask may still be located at a plane of focus of the laser, which may be displaced a little from back focal plane i.e. the laser may be defocused a little (or the laser may be focused on the back focal plane but filter displaced from this a little and with a slightly larger filtering region than it would otherwise have).

Where used to image a particle in solution (as opposed to constrained on a glass surface) the method may further comprise confining motion of the particle in a direction along the optical axis, i.e. z-direction, to less than a distance $$\frac{3}{2}\lambda, \lambda, \frac{\lambda}{2}, \text{ or } \frac{\lambda}{4},$$

where $\lambda$ is the wavelength of the coherent light (in the solution). This may be done, for example, by suitably sizing the chamber or channel, e.g. providing a pair of opposite boundaries spaced apart by this distance in the z-direction. A range of $$\frac{\lambda}{2}$$

represents a range of maximum contrast to zero contrast in the interference image. Restricting the particle motion in this way, e.g. to within $$\frac{\lambda}{4},$$

facilitates tracking the particle because the particle is inhibited from disappearing from view (and reappearing elsewhere). However it is not essential for the z-direction movement to be limited to $$\frac{\lambda}{2} \text{ or } \frac{\lambda}{4},$$

for some benefit to be obtained.

As previously described, the method uses scattering and not, for example, fluorescence. Thus the particle may be a non-fluorescent particle. The particle may be label-free. In general the method is used off-resonance, i.e. away from an absorption peak/edge of the particle. However this is not essential and in principle light near an absorption peak/edge may be used.

In a related aspect there is described an interferometric scattering optical microscope. In implementations the microscope may comprise a particle detection region, e.g. comprising a chamber or channel or a droplet on a surface, the particle detection region having a boundary defined by an interface, a source of coherent light such as a laser, and an objective lens to direct the coherent light to illuminate a particle in the particle detection region such that the light is reflected from the interface and scattered by the particle. The objective lens has an optical axis and is configured to capture the reflected light and the scattered light. The microscope may further comprise an imaging device configured to image interference between the reflected light and the scattered light. The coherent light illuminating the particle is at an oblique angle to the interface. Thus an optical path of the coherent light to the objective lens may be offset from the optical axis of the objective lens. In implementations the coherent light may be provided to the objective lens in a direction parallel to and offset from the optical axis.

In some implementations the source of coherent light is linearly polarized as previously described. Thus the coherent light illuminating the particle may be partially or completely p-polarized with respect to a plane of incidence of the coherent light on the interface.

In some implementations the source of coherent light is linearly or circularly polarized, and an analyser with an orthogonal polarization is provided in an optical path between the particle and the imaging device. This may provide a signal dependent upon a shape asymmetry of the particle, but with reduced signal to noise ratio.

An optical path between the objective lens and coherent light source may include a beam splitter to separate the returned reflected and scattered light from the incident illuminating light, but this is not essential as in implementations these two light paths are at different spatial positions with respect to the optical axis. The imaging device may comprise a 1D or 2D image sensor, e.g. an EMCCD (Electron Multiplying Charge Coupled Device) sensor or a fast CMOS camera, and an optical element such as a lens or mirror to focus the returned light onto the sensor.

In some implementations the microscope/method is configured to process the imaged interference to determine a difference between the imaged interference at two different times e.g. using a processor under stored program control. For example a difference frame may be determined between two interference image frames, or groups of frames, captured by the imaging device. The difference frame may be Fourier transformed, e.g. by the processor, to determine a Fourier image. This may then be processed to characterize the particle or a solution of the particles, for example by selecting a portion of the Fourier image within an expected scattering circle. The expected scattering circle may comprise a region of the Fourier image within which interference between the reflected light and the scattered light from the particle(s) is/should be confined. The region of the Fourier image within the expected scattering circle may be processed, e.g. to determine a level or measure of scattering into this region, to characterize the particle(s) or a solution of the particles.

Other features of the microscope may correspond to those of the previously described method, i.e. the microscope may include systems/devices to implement these features.

DRAWINGS

These and other aspects of the system will now be further described by way of example only, with reference to the accompanying figures, in which.

In the figures like elements are indicated by like reference numerals.

DESCRIPTION

Figure 1:
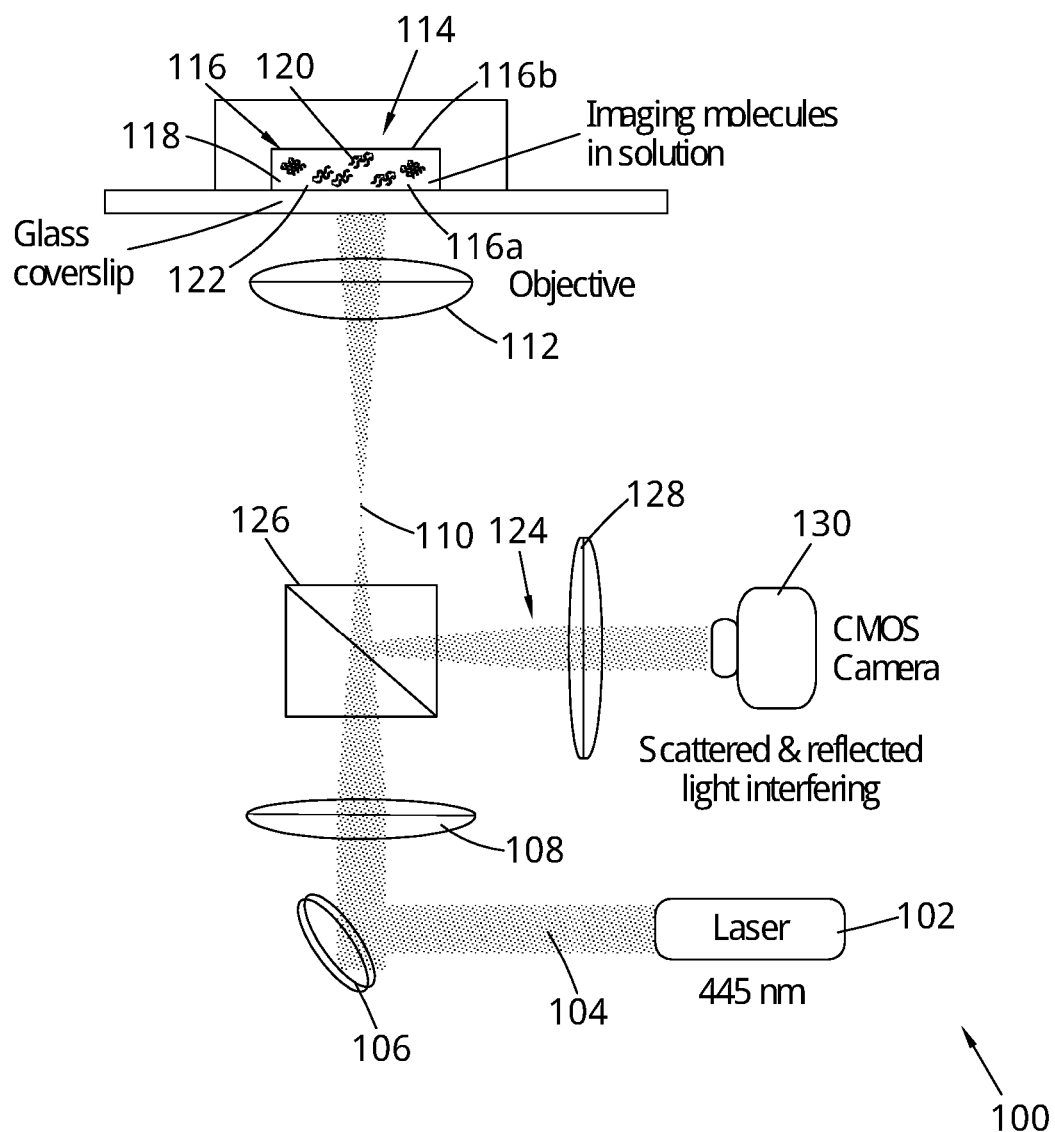
FIG. 1 shows a schematic diagram of an interferometric scattering (iSCAT) optical microscope.

Referring to FIG. 1, this shows a schematic diagram of an interferometric scattering (iSCAT) optical microscope 100. The microscope comprises a continuous wave laser 102 which provides a beam 104 of coherent light to a focusing element, lens 108, which focuses the beam at the back focal plane 110 of a microscope objective lens 112. In this example the laser is in the visible, at 445 nm, and mirror 106 folds its optical path to lens 108. The laser may have a coherence length of greater than 50 µm or 100 µm and/or less than 100 mm or 10 mm.

The objective lens 112, which may be an oil immersion objective, may be adjusted to provide generally uniform illumination in a detection region 114. In the example of FIG. 1 the detection region 114 is defined by a chamber or channel 116 with upper and lower surfaces 116a, b, fabricated, for example, from glass or polymer. The chamber/channel 116 may contain a solution 118, such as an aqueous solution (i.e. water), containing one or more particles 120 to be imaged. In some other arrangements particles to be images may be immobilised on a glass surface, such as the surface of a cover slip. In some implementations the distance between surfaces 116a, b may be of order half a wavelength of the coherent light in the solution, to maintain an imaged particle in view.

The illumination is reflected from a reflecting interface 122, e.g. between the lower surface 116a of the chamber/channel 116 and the solution 118. The illumination is also scattered by the particle(s) 120. Both the reflected light and the scattered light is captured by objective lens 112, passed back along the optical path of the illumination, and directed into a separate path 124 by a beam splitter 126. The reflected light and scattered light is then imaged. For example the reflected light and scattered light is focused onto an image sensor 130 by imaging optics such as a lens 128. The image sensor (camera) may be, for example a CMOS image sensor or an EMCCD image sensor; it may have a frame rate sufficient to capture and track movement of an imaged particle.

Figure 2A:
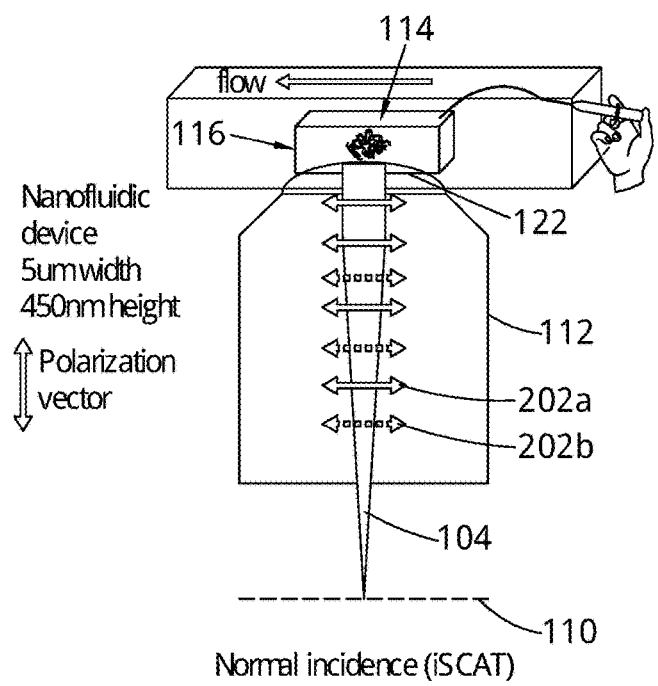
FIGS. 2a and 2b illustrate, respectively, normal illumination and oblique angle illumination techniques for the iSCAT optical microscope of FIG. 1.

FIG. 2a shows details of a normal incidence illumination technique for the iSCAT optical microscope of FIG. 1. The beam 104 of coherent light may be unpolarized; that is it may comprise light of two orthogonal linear polarizations 202a, b or more generally it may have elliptical polarization. In the particular example illustrated solution flows along channel 116, which has a height (z-direction) of around 450 nm and a width of around 5 µm.

Figure 2B:
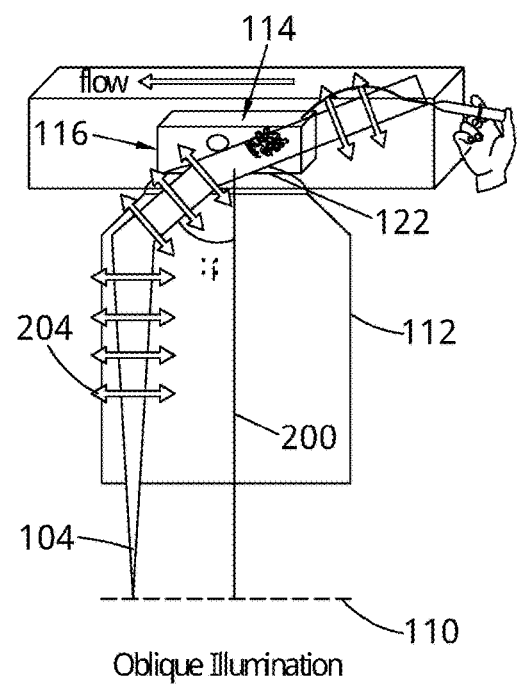

FIG. 2b shows details of an oblique angle illumination technique for the iSCAT optical microscope of FIG. 1. An optical axis of objective lens 112 lies along the direction of line 200, which represents the reflected light and scattered light captured by the objective. The beam 104 of coherent light which illuminates the detection region 114, is off-axis, that is it is displaced away from optical axis 200; an axis of beam 104 may be parallel to the optical axis 200. Thus the beam 104 defines an angle $\theta_i$ to the optical axis 200 at the point of exiting the objective, which is at an oblique angle to the reflecting interface 122. (The direction of this beam is subsequently modified by refraction but the illumination nonetheless remains at an oblique angle to interface 122).

By the imaged particle(s) illuminating at an oblique angle the level of signal, i.e. interference between the scattered and reflected light, compared with the background level of reflected light is increased. The proportion of these components may be adjusted by adjusting the oblique angle—if the angle $\theta_i$ is too large the intensity of scattered light along direction is reduced; if it is too small the reflected light reduces the signal-to-noise ratio. The optimum angle can be found by experiment; in general it can depend on the noise floor of the camera.

In some implementations the oblique illumination may be partially or completely linearly polarized, in particular p-polarized 204, to reduce the level of light reflected from interface 122. At Brewster's angle the level of light reflected from interface 122 reduces to substantially zero (in reality it is greatly reduced but not to zero as the laser is not perfectly collimated). In practice the oblique angle may be backed off slightly from Brewster's angle to provide some reflected light to generate the interference. Controlling the polarization of the illumination is advantageous as it allows the reduction in reflected light intensity to be somewhat decoupled from the reduction in scattered light intensity captured along direction 200.

Figure 2C:
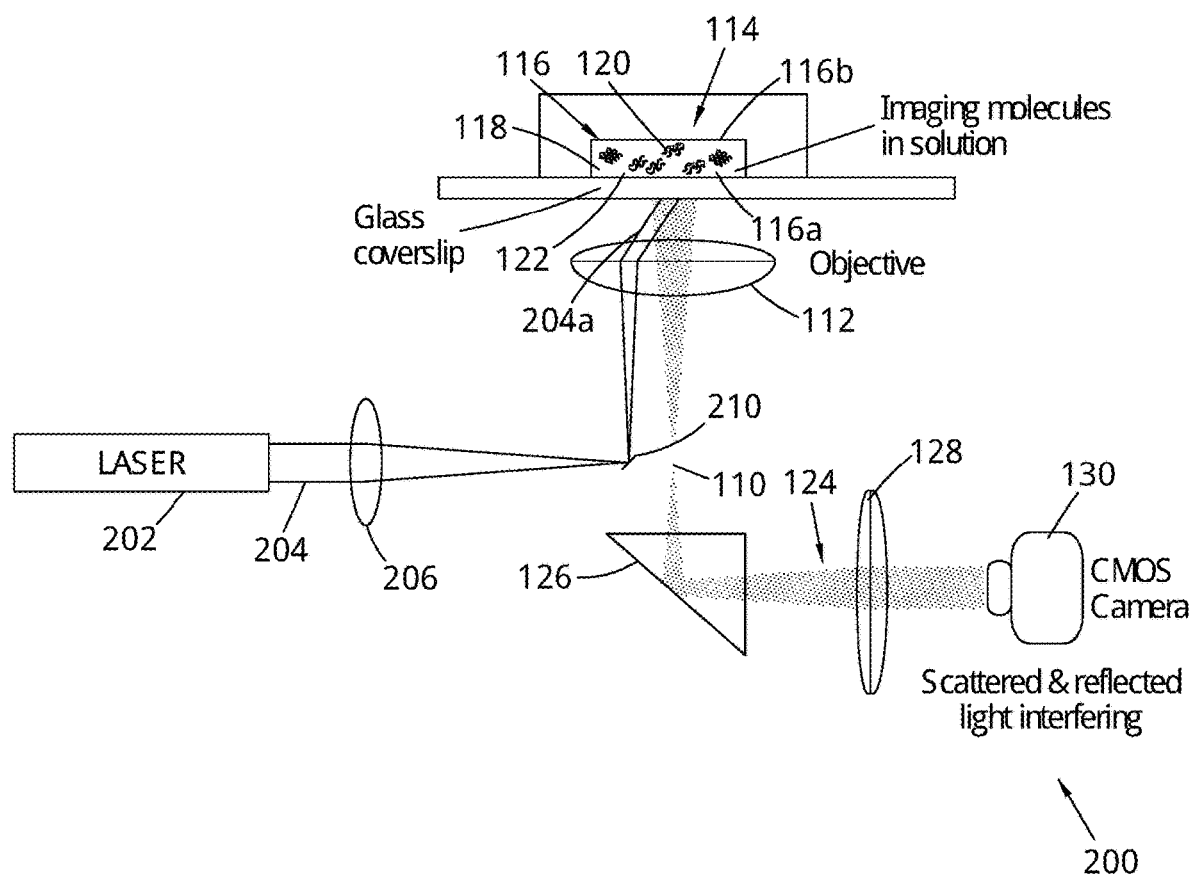
FIG. 2c shows a modification to the microscope of FIG. 1 to implement oblique angle illumination according to an embodiment of the invention.

FIG. 2c shows an example implementation of the oblique angle illumination technique of FIG. 2b in the context of the microscope of FIG. 1.

Thus FIG. 2c shows a schematic diagram of an iSCAT optical microscope 200 including a laser 202 to generate a beam 204 of coherent light. The beam 204 is focused for example by a lens 206 e.g. onto a back focal plane of objective lens 112. A reflector, diagonal mirror 210, directs the beam 204 of coherent light off-axis into objective lens 112, i.e. the beam 204 is displaced away from an optical axis of objective lens 112, direction 200 in FIG. 2b. The off-axis beam 204 is transformed by the objective lens 112 into a collimated beam 204a illuminating the reflecting interface 122 at an oblique angle.

Figure 3A:
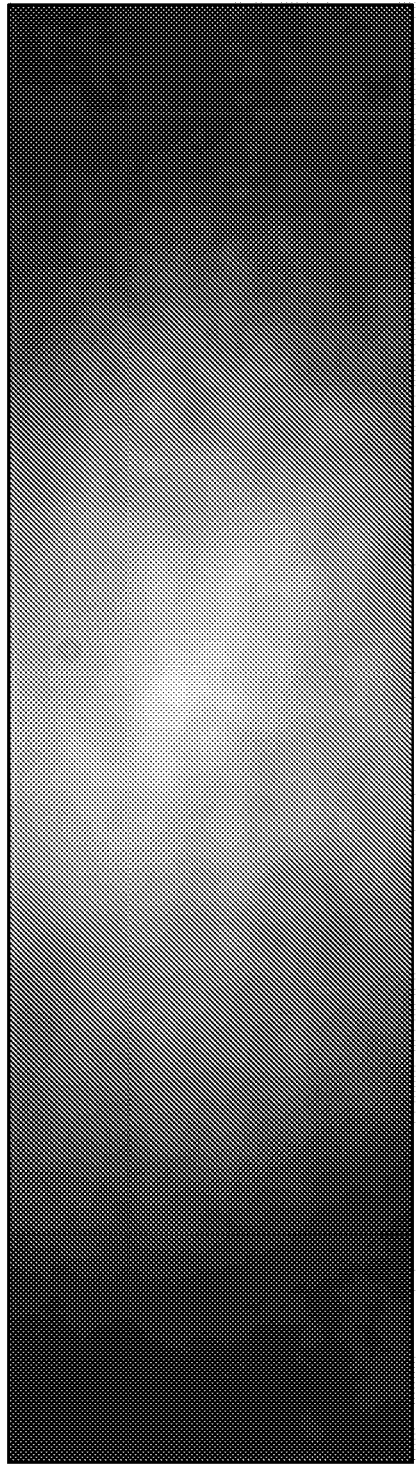
FIGS. 3a and 3b illustrate, respectively, images captured using the normal and oblique incidence illumination techniques of FIG. 2.
Figure 3B:
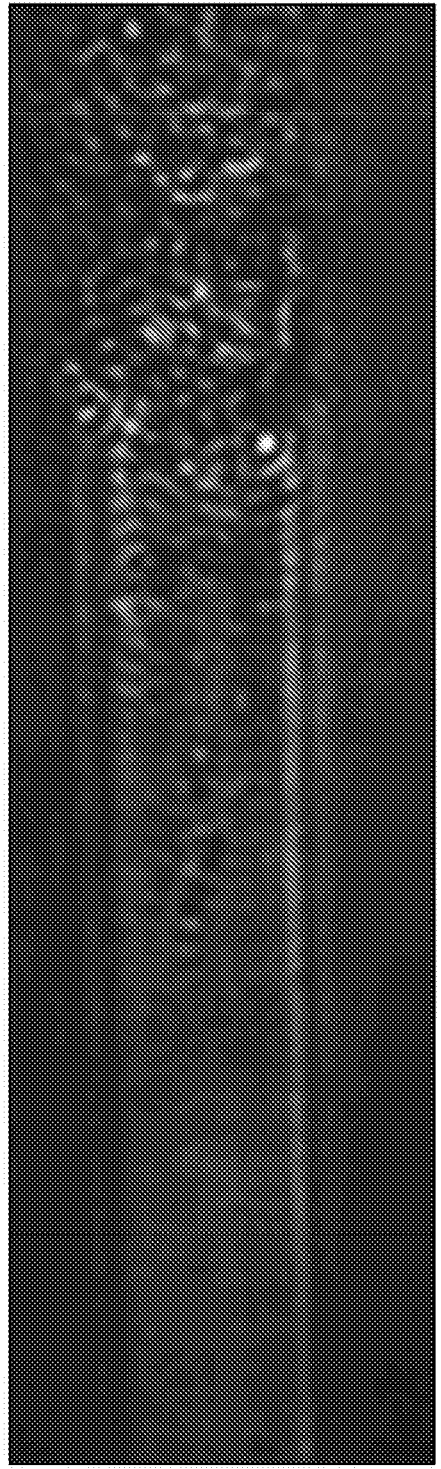

FIGS. 3a and 3b illustrate, respectively, images captured using the normal and oblique incidence illumination techniques of FIG. 2. It can be seen that FIG. 3b, captured using oblique illumination, shows much greater interference contrast than FIG. 3a, and consequently much more image detail. In practice to detect a particle such as a single molecule, a differential detection e.g. background subtraction technique may be employed.

As described in more detail later, a captured interference image of a particle may be termed a hologram as what is captured is an interference pattern. However the hologram typically has a bright (or dark) central region (depending on the phase), which gives the appearance of a particle.

In implementations the interference contrast may refer, for example, to a ratio of light intensities between bright and dark regions of an interference pattern (of the iSCAT microscope), or to a ratio of image brightness values between bright and dark regions of an interference image (of the iSCAT microscope).

Further details of some example implementations are now described.

Example Implementations

In implementations of interferometric scattering (iSCAT) a high intensity carrier wave is interfered with a scattered signal, which allows the system to operate in a shot-noise limited regime. The dependence of the signal on the particle diameter goes as the third power; a scattering label, typically a gold nano particle, can be used to increase the scattering cross section. iSCAT can be used for detecting particles in solution e.g. in water, which allows estimation of their diffusion coefficient. However in this application the integration time is limited as the particle should not diffuse further than the point spread function width, though a subcritical angles of incidence can decrease background scattering and improve signal to noise ratio.

Interferometric scattering (iSCAT) works by collecting both the scattered light and the reflected light on the detector. As both of them have the same wavelength they will interfere. The collected intensity ($P_{col}$) is the result of the reflected electric field ($E_r$) and the scattered electric field ($E_s$):

$$P_{col} = |E_r + E_s|^2 = P_{inc}[|r|^2 + 2|r||s|\cos\phi + |s|^2] \approx P_{ref} + P_{int}$$

where the incident power is $P_{inc}$ and the reflected power is $P_{ref} = P_{inc}|r|^2$ with r the electric field reflection coefficient. The interfering power is $P_{int} = P_{inc}2|r||s|\cos\phi$ where s is the scattering coefficient and $\phi$ is the phase difference. The reflection coefficient (r) is given by the Fresnel equations (see later) and the scattering cross section $\sigma = |s|^2$ is given by Rayleigh Scattering (see later). Usually $|s| \ll |r|$ and so the final $|s|^2$ term is negligible. The reflected term $P_{ref}$ can be removed if it changes more slowly than the interfering term $P_{int}$. This is the case for a diffusing sample or for binding events, for example. The contrast is dependent on the reflectivity:

$$C = \frac{P_{int}}{P_{ref}} = \frac{2|s|\cos\phi}{|r|}$$

but surprisingly the signal to noise ratio is not: Assuming the system is shot noise limited, the noise is given by $P_{noise} \propto \sqrt{P_{col}} \approx \sqrt{P_{ref}}$. The signal to noise ratio (SNR) is:

$$SNR \propto \frac{P_{inc} 2|r||s|\cos\phi}{\sqrt{P_{inc}|r|^2}} = 2\sqrt{P_{inc}}|s|\cos\phi$$

which is independent of the reflected intensity. The scattering coefficient can be improved by decreasing the laser wavelength; otherwise it appears that the only way to improve the signal to noise ratio is to increase the laser power or to use longer integration times, though longer integration times are limited by drift.

Oblique Illumination

Figure 4:
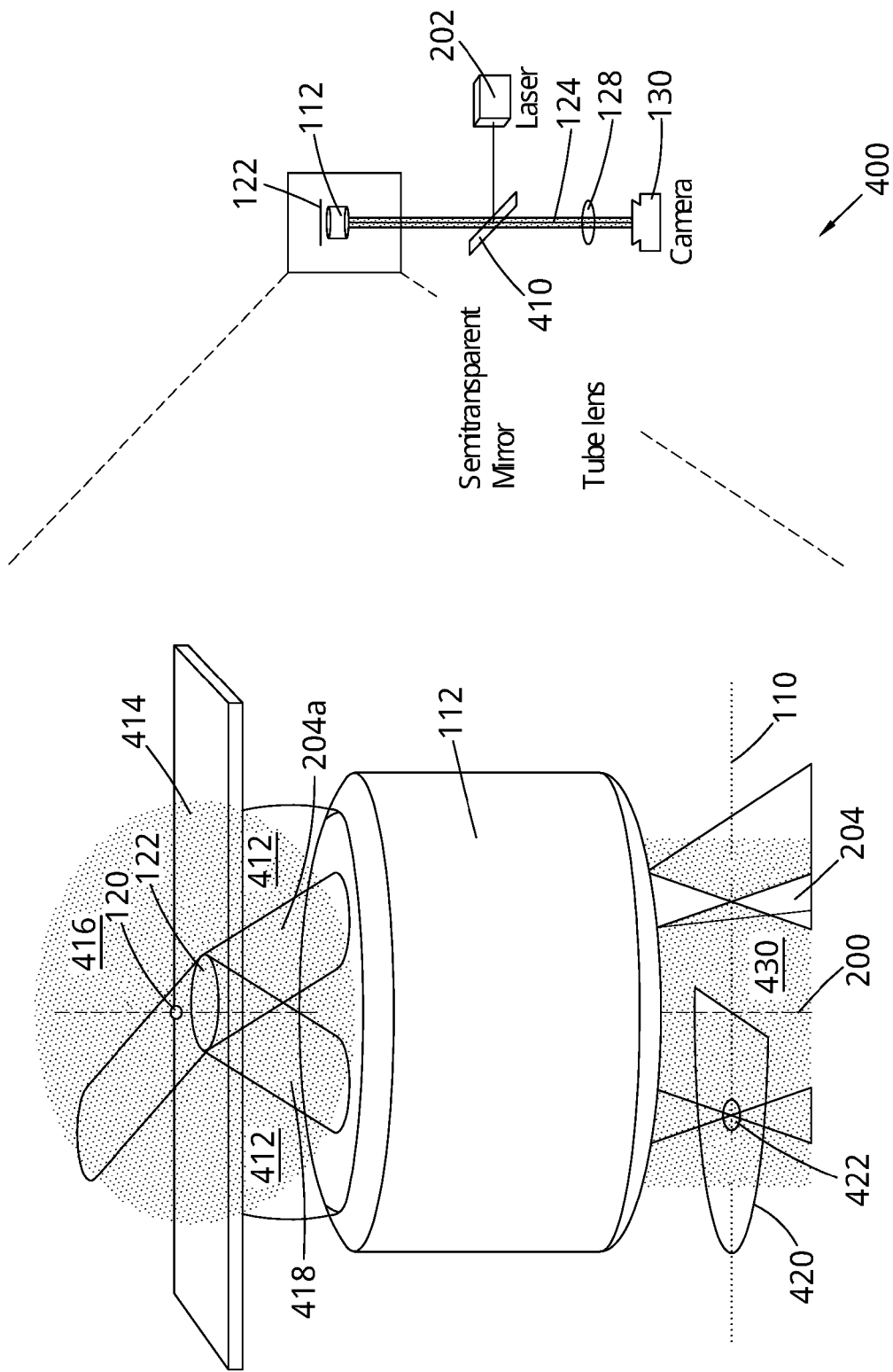
FIG. 4 shows, schematically, details of the optical geometry of a further example of an iSCAT microscope with oblique angle illumination.

FIG. 4 shows, schematically, details of the optical geometry of a further example of an iSCAT microscope 400 as described herein.

As previously, a beam 204 of coherent light, e.g. from a laser 202, is reflected on a semitransparent mirror or beamsplitter 410, in this example displaced away from the back focal plane 110 of the objective lens 112. The beam 204 is focused onto a back focal plane of the objective lens 112, collimated by the objective lens 112 and, in this example passes through a refractive index matched oil 412 to the reflecting interface 122. The beam 204 is offset from the optical axis 200, and this exits the objective lens 112 as a collimated beam 204a at an oblique angle to the reflecting, glass-water interface 122.

In this example the reflecting interface 122 comprises a glass-water interface formed by the interface between a glass wall 414 of a chamber or channel and an aqueous solution in region 416. As the beam 204 traverses this path small amounts of light are reflected at other interfaces on the path such as interfaces in the objective lens 112; the index matched oil 412, matched e.g. to a refractive index of the final element of the objective, reduces the number of interfaces the illuminating light sees in the path. The intensity of the glass-oil reflections is nearly zero because the oil is index-matched.

At the glass-water interface 122 the illuminating light is separated into transmitted and reflected components. The transmitted illumination reaches one or more particles 120 in the aqueous solution that scatter the illumination. The scattered light is scattered in many directions e.g. approximately over a sphere (though this depends on factors such as the shape and configuration of the scattering particle and the polarization of the light). Some of the scattered light is collected by the objective lens 112 and provides a beam of scattered light 430 which in implementations extends across a width of the rear surface of the objective and travels in direction 200 along the optical axis.

The reflected light returns along path 418, at an angle of reflection which matches the angle of incidence, to objective lens 112. The objective lens 112 which focuses the reflected light on the back focal plane 110 in a region displaced away from the optical axis 200, on the opposite side of the axis to the illuminating beam 204. This reflected light interferes with the scattered light at the detector e.g. camera 130, generating interference fringes In some implementations a spatial filter 422 may be located at or near the back focal plane 110 of the objective lens 112 to further improve the contrast. For example the spatial 422 may comprise a disk located at the focus of the reflected beam, with an extent corresponding to an extent of the focal spot of the reflected beam or larger. The spatial filter may comprise a light-attenuating mask 422 on a substantially transparent mask support 420 e.g. having a half disk shape (on the side of the optical axis which includes the reflected beam). A method for determining a degree of transmissivity of the light-attenuating mask 422 is described later.

Spurious and Interfering Reflections

The preceding analysis assumes that the reflection is interfering with the scattering intensity. This is only true if the path difference is smaller than the coherence length of the laser (see later), typically hundreds of micrometers (for laser diodes). However the laser illumination is reflected from the back of the objective, and at every interface it crosses. Even objectives with anti-reflection coatings do not have 100% transmittance, in which that case the collected intensity can be rewritten with the reflected intensity separated into interfering and spurious reflection components:

$$P_{col} = |E_{ri} + E_{rs} + E_s|^2 = P_{inc}[|r_i|^2 + |r_s|^2 + 2|r_i||s|\cos\phi + |s|^2]$$

where the spurious reflection electric field $E_{rs}$ does not interfere with the scattered signal or the signal reflected from the interface; the interfering reflection electric field is $E_{ri}$. Therefore, the signal to noise ratio (SNR), above, is reduced if $|r_s|^2 \gg |r_i|^2$:

$$SNR \propto 2\sqrt{P_{inc}\tau}\,|s||\cos\phi|\left(1 + \frac{|r_s|^2}{|r_i|^2}\right)^{-1/2}$$

In the cases considered here only the reflection at the reflecting interface 122, e.g. a glass-water interface, will be an interfering reflection. Fresnel's law (see later) can therefore be used to distinguish the two reflection types.

Figure 5:
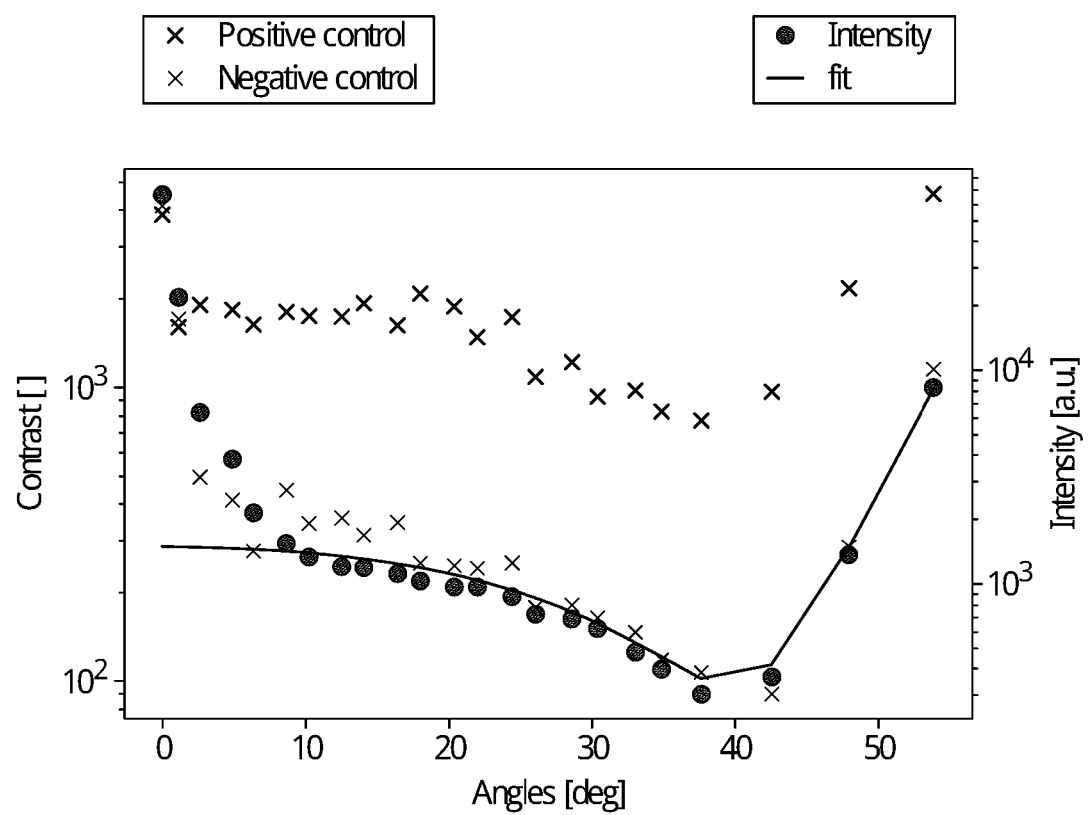
FIG. 5 shows a plot of contrast and intensity of the iSCAT signal seen by the camera against angle of incidence.

FIG. 5 shows a plot of contrast and intensity of the iSCAT signal seen by the camera against angle of incidence. The measured intensity (dots) comprises the reflected intensity, fitted with a line and a component due to spurious reflections near the normal (0 degrees), where the dots diverge from the line. At angles greater than that at which the dots meet (in this example around 10 degrees) the line the effect of the spurious reflection(s) essentially goes to zero (noting the log scale). Two regions of the image are analysed, a region with a strong scatterer (positive control, upper crosses), and a region without apparent scatterers (negative control, lower crosses). Without spurious reflection(s), the distance in log space between the scattering and background should be constant and the value should depend on the reflected intensity (the signal, and hence also the signal to noise ratio, relates to the difference between the upper and lower crosses). Below around 10 degrees this is not the case and the signal to noise ratio goes to zero at small angles (i.e. the upper and lower crosses converge).

Thus the line represents the fitted intensity using the Fresnel equations. The dots, which are the measured intensities, follow this line for high angles, but diverge from the fit at normal incidences due to spurious reflections. The effect can be seen on the contrast of a region with a strongly scattering particles, and a background region: Both the noise and the scattered intensity are proportional to |r| and both contrasts follow the line shape, but not at normal incidence where the contrast is masked by the spurious reflection.

Image Deformation

The image is formed by interference between the scattered light and the interfering reflection. The shape of the interference pattern can be calculated from the wavelength and the laser angle (see later).

Figure 6:
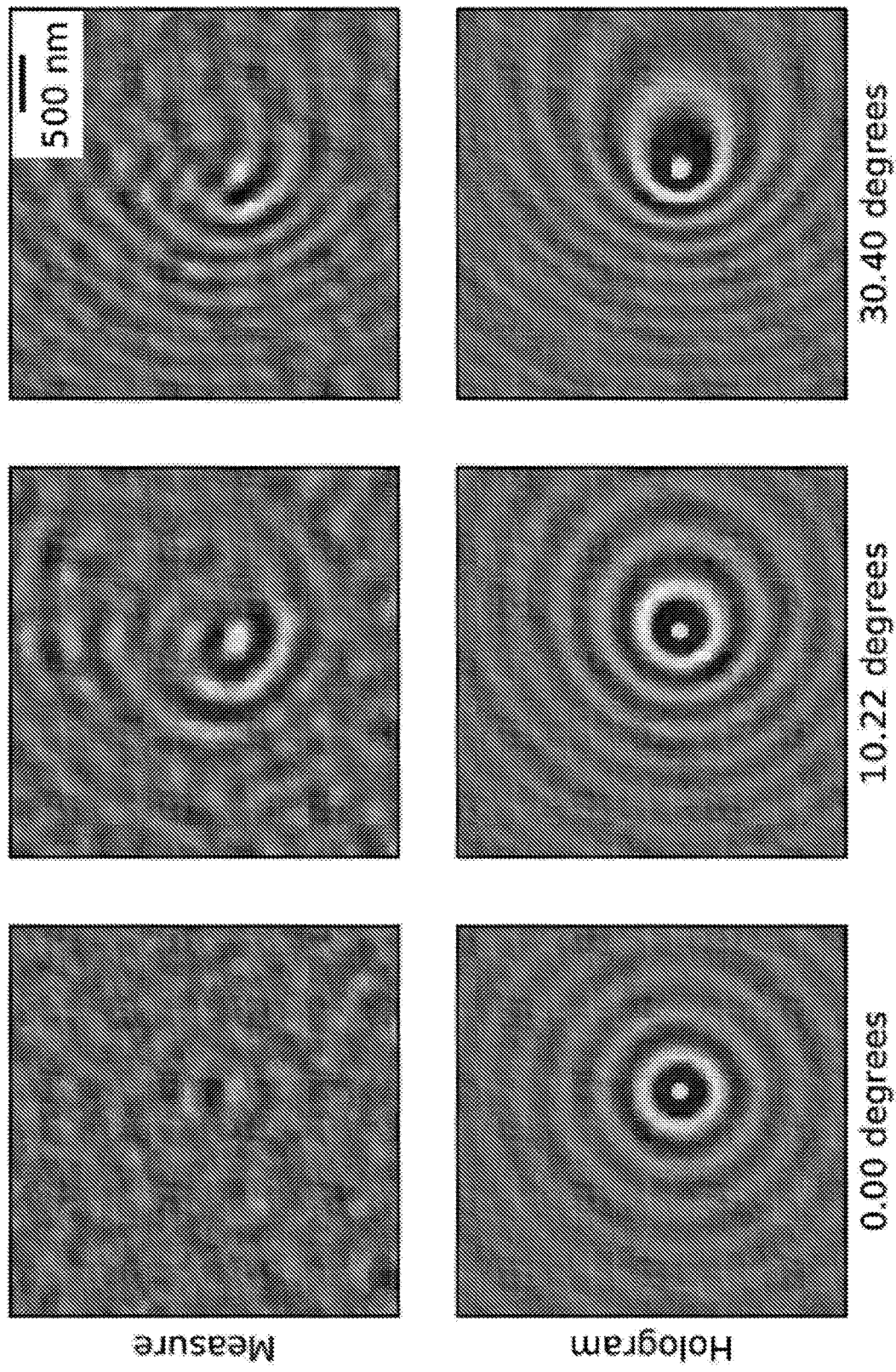
FIG. 6 shows example interference images from a strongly scattering particle (top row) and corresponding predicted interference patterns (bottom row).

FIG. 6 shows example interference images from a strongly scattering particle (top row) and the corresponding predicted interference patterns i.e. holograms (bottom row) for different angles of incidence of the illuminating beam. At normal incidence the strong spurious reflection hides the signal but at higher angles of incidence, the spurious reflection is not present but the image becomes progressively more distorted as the circular pattern becomes more elliptical. To minimize distortion the angle of incidence can be chosen to be at or just above the angle where the spurious reflection is manifest. This may be defined as an angle at which, at the imaging device, an intensity of the reflected light is greater than an intensity of light reflected from a back surface of the objective lens. To minimize distortion the angle may be no more than this angle plus e.g. 10 degrees.

Increased Contrast

Decreasing the reflected intensity will increase the contrast, C, as shown in the above equation for C. Surprisingly, it does not change the signal to noise ratio, SNR, as shown in the above equation for SNR. Improving the contrast is useful as it decreases the pressure on the dynamic range of the camera, and can help the user to glimpse the scattered signal while looking at an unprocessed video, for example while focusing. When using oblique illumination two techniques may be employed to achieve this. First, the Brewster angle of incidence may be used to decrease the reflected intensity, although this typically requires a fixed polarisation and angle. Also or instead a spatial filter may be located at the back focal plane as shown in FIG. 4. This is not possible with normal incidence as both the incident and reflected laser pass through the same point, but with oblique incidence it is possible to only filter the reflected intensity as the incident and reflected light are spatially separated.

Fourier Plane

An objective lens creates a Fourier transform of the focal plane on the back focal plane. The Fourier plane can be recreated from the image by taking a Fourier transform of the interference image i.e. hologram, e.g. a fast Fourier transform (FFT) as described later.

Figure 7:
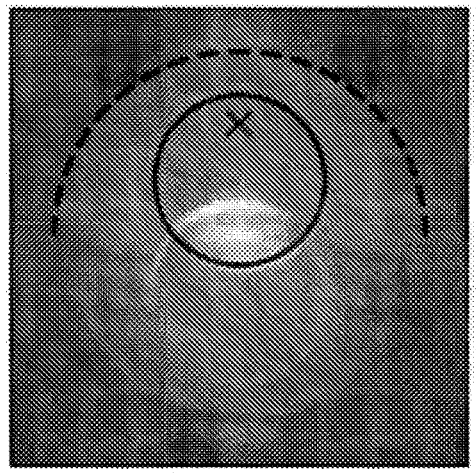
FIG. 7 shows Fourier transforms of interference images captured at different angles of incidence in an iSCAT microscope.
Figure 7:
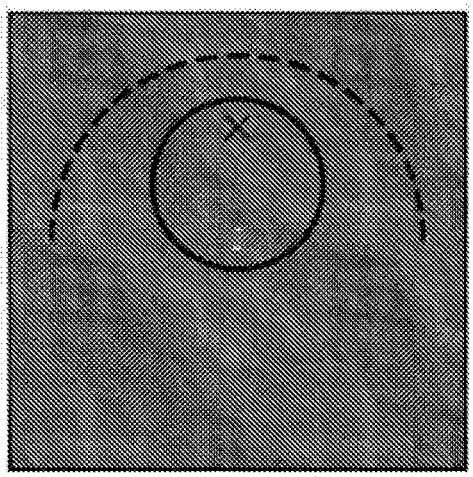
Figure 7:
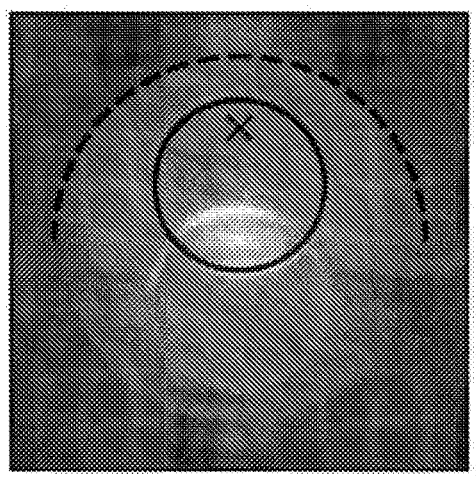
Figure 7:
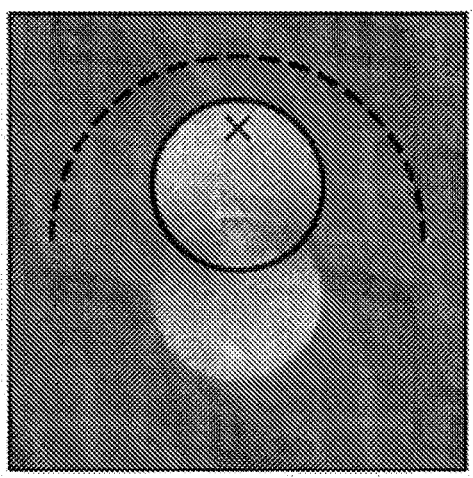
Figure 7:
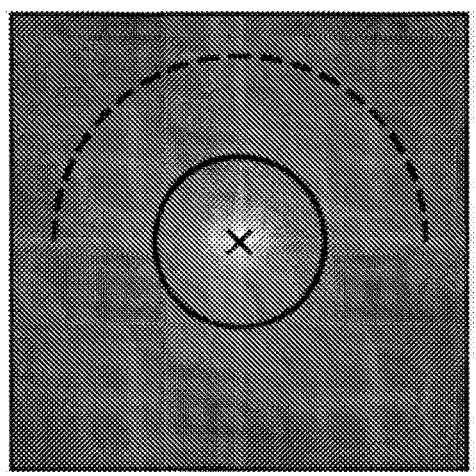
Figure 7:
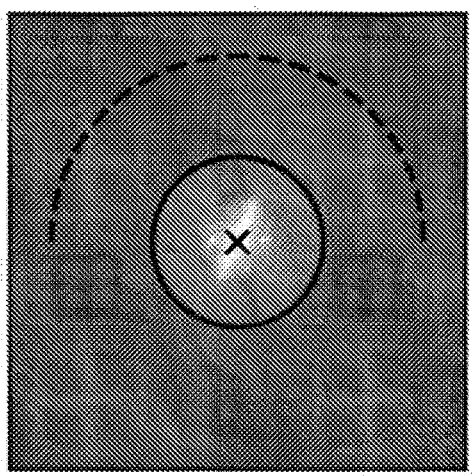

FIG. 7 shows fast Fourier transforms of interference images (holograms) captured at different angles of incidence in an iSCAT microscope. The images are of a 100 nm particle (left and middle images) and a 40 nm particle (right images). As the phase information is lost when the light reaches the camera the reconstructed Fourier plane shows a symmetric pattern. A distance between the centers of the circles in the middle and right images is proportional to the translation of the illuminating laser from the optical axis (later, ΔX).

In FIG. 7 the dashed circle indicates the Abbe diffraction limit (imposed by the numerical aperture). The solid line indicates the expected scattering circle, computed as described later, referred to here as the Fourier circle. The cross indicates the position of the reflected laser. The size of the reflected laser spot (most easily seen in the bottom right image) can be reduced by accurately focusing the lens 128 so that the focal length matches the distance from the lens to the back focal plane of the objective; it may then be filtered out from the Fourier transform.

At normal incidence (left images) the reflected laser dominates both the single frame and the difference particle images while it is barely visible at higher angles: By increasing the angle of incidence (middle and right images) essentially only the interfering reflection is visible. In the particular example shown the scattering signal from the 100 nm particle is stronger than the camera shot noise while that from the 40 nm particle is hidden in the noise.

As the scattered signal is contained in the Fourier circle the remainder of the image (outside the expected scattering circle) can be filtered out, greatly reducing the shot noise. The residual spot from the laser reflection can be reduced if a spatial filter is used as previously described.

In FIG. 7 the top row shows the FFT of a single frame and the bottom row shows the FFT of a difference between two e.g. consecutive frames (a differential frame); in this example the frame rate is adjusted to 125 FPS by summing consecutive frames. Thus the bottom row shows only dynamic elements of the captured images e.g. parts of the captures interference images which relate to moving particles.

The signal inside the Fourier circle e.g. the integrated amplitude or intensity over the area of the Fourier circle, in the FFT of a differential frame can be used as a (one-dimensional) measure of the amount of scattering in a frame. This may be used as a measure of the concentration and/or size of the particles in a sample of the solution containing the particles; the measure may be calibrated to determine a value for the concentration and/or size of the particles.

Example Apparatus Configuration

Referring again to FIG. 4, in one example implementation a laser is reflected on a semitransparent mirror and focused on the back focal plane of an objective. The laser or an optical element to guide the laser may be mounted on a stage to allow a translation of the laser focal spot on the back focal plane while keeping the laser parallel to the objective optical axis. An oil immersion objective may be used to avoid creating interfaces between the objective and the glass (e.g. cover slip). A lens 128 e.g. a tube lens focuses the image onto a camera 130.

The laser may be focused on the back focal plane, so that the laser exits the objective as a collimated beam. The location of the back focal plane may be found by minimizing a size of a spot on a distant screen (e.g. a wall or ceiling) while changing the focal spot position. The reflected intensity will then also be focused on the back focal plane, and an optimum position of the tube lens can be found by imaging the back focal plane and minimizing the reflected spot. This can be done either by using another tube lens with half the focal lens to image the Fourier plane directly, or by applying a Fast Fourier transform to the recorded image.

The laser should be parallel to the objective optical axis. An offset between the optical axis and the laser axis may be applied to change the illumination angle of incidence. A plot of the type shown in FIG. 5 may be drawn e.g. by recording the intensity of the reflected signal and fitting this to the Fresnel equation. The range of angles at which a spurious reflection is visible can therefore be identified and an oblique angle of illumination for the iSCAT microscope, i.e. an angle of incidence for the illuminating beam, may be selected accordingly.

In some implementations the angle of incidence (90 degrees minus the oblique angle of illumination of the reflecting interface) may be sufficiently large to substantially remove the spurious reflection but not significantly greater than this to reduce distortion of the interference image—for example in the range 1-30, 3-20 or 5-15 degrees, e.g. around 10 degrees in the example of FIG. 5.

A dynamic part of the image may be extracted by taking a difference between two interference image frames or between two sets of frames, e.g. groups of averaged frames. As previously described the Fourier circle may be used to remove a large part of the camera shot noise which is located outside of the circle (in the example of FIG. 7 the region within the solid line is retained together with its symmetrical counterpart). The noise created by the laser reflection can be removed as it is well localized in the Fourier plane. Note that if the tube lens is not properly placed so that the distance from the objective to the tube lens is equal to the tube lens focal length, the location of noise from the reflection will be blurred in the Fourier plane.

The spatial mask, if used, should ideally be located on the back focal plane. The reflected laser should pass through a region of low transmittance while the rest of the back focal plane should be as transparent as possible.

In broad terms, the goal is to have, at the same time, both a large signal to noise ratio (SNR) and a large interference pattern contrast. To increase the contrast the reflected intensity should be reduced as much as possible. In principle this does not affect the SNR if the noise is shot noise-limited. However as the intensity is reduced eventually other sources of noise dominate and the SNR begins to decrease. Thus the transmittance of the mask should be reduced until other background noise starts to become apparent e.g. until the shot noise is at or just above the background noise e.g. not more than 2× or 10× the background noise. The background noise arises from many sources e.g. stray illumination, electrical noise in the detector (camera), and so forth.

In the interference pattern, if the mask were transparent, the shot noise would dominate the noise component of the detected interference signal (provided the source laser is bright enough). The shot noise scales as $\sqrt{n}$ where n is the number of photons. As the mask transmittance decreases there are fewer photons, which implies a reduced level of shot noise. However with very few photons the other noise sources become apparent. It can be advantageous to reduce the transmissivity of the mask to block as much of the reflected light as possible whilst the shot noise is still dominant. In practice this may be a transmissivity of order 10%, but this figure depends significantly on implementation details. As a practical technique, a transmissivity of the mask may be decreased until the background noise is observed, then backed off slightly from this value.

If the back focal plane is not accessible the focal position of the laser focus may be adjusted slightly so that the focus of the reflected beam is located at the spatial mask. Alternatively the laser may be focused on the back focal plane but filter displaced from this a little, thus having a slightly larger filtering region than it would have otherwise.

The described techniques can improve iSCAT by removing the spurious reflection that limits the signal to noise ratio. The contrast can also be improved in various ways, for example by using the Brewster angle and/or a spatial filter on or near the back focal plane.

To aid in understanding the techniques it is useful to described some of the underlying theory.

Scattering

Rayleigh scattering describes the scattering from small particles, typically much smaller than the wavelength. The intensity $I_s$ at a distance X from a particle with a scattering angle θ is proportional to the incident intensity $I_0$:

$$I_s = I_0 \frac{1+\cos^2\theta}{2X^2}\left(\frac{2\pi n_m}{\lambda}\right)^4\left(\frac{n_p^2-n_m^2}{n_p^2+2n_m^2}\right)^2 r^6$$

where $n_m$ is the refractive index of the surrounding medium, $n_p$ is the refractive index of the particle, λ is the wavelength of the coherent light, and r is the radius of the particle.

Integration over the angles gives the scattering cross section σ. Asymmetry may be detected by using a crossed-polarization arrangement to detect changes in polarization caused by the particle's shape asymmetry; this signal is much weaker than the scattered intensity.

By focusing the laser at the back focal plane of the objective, oblique illumination can be applied to the sample. If the particles of interest are relatively far from the surface the technique can operate at subcritical angles to get some intensity i.e. signal from an interior region of a channel or chamber or from the interior of a droplet on a coverslip. For an oil-immersion objective the focal length of the objective $f_{obj}$ can be computed from the focal lens of the tube lens $f_{tl}$ and the magnification (Ma) using:

$$f_{obj} = \frac{f_{tl} n_{oil}}{Ma}$$

where $n_{oil}$ is the refraction index of the immersion oil. The incidence angle may then be computed from the distance of the laser position on the back-aperture (back focal plane) from the optical axis (ΔX):

$$\sin(\theta_{oil}) = \frac{\Delta X}{f_{obj}}$$

where sin may be used instead of tan because the objective is corrected for the Abbe sine condition. The angle in the water can then be computed from Snell's law:

$$\sin(\theta_{water}) = \frac{n_{oil}}{n_{water}} \sin(\theta_{oil}) = \frac{n_{oil}}{n_{water}} \frac{\Delta X}{f_{obj}}$$

The coherence length is the maximum distance over which light is coherent with itself and depends on the spectral width of the light source e.g. laser. For iSCAT a short coherence length can help to avoid interference from many reflections. Laser diodes have relatively broad spectrums, e.g. Δλ=2 nm; the coherence length L is given by:

$$L = \sqrt{\frac{2\ln 2}{\pi}} \frac{\lambda^2}{\Delta \lambda}$$

and for a typical laser diode can be as short as 100 μm. Thus a reflection from a rear surface of the objective lens will typically not contribute to the interference signal.

The Fresnel equations describe the reflected and transmitted coefficient from a medium 1 to a medium 2 depending on the incidence angle. They are, for s-polarized light:

$$R_s = \left| \frac{\cos\theta_i / n_2 - \cos\theta_t / n_1}{\cos\theta_i / n_2 + \cos\theta_t / n_1} \right|^2$$

And for p-polarized light:

$$R_p = \left| \frac{\cos\theta_t / n_2 - \cos\theta_i / n_1}{\cos\theta_t / n_2 + \cos\theta_i / n_1} \right|^2$$

At Brewster's angle there is no reflected light for p-polarization, though light from a real laser is typically not perfectly collimated and polarized so some reflection will still occur.

The objective lens transforms circular waves into collimated beams and vice-versa. This is mathematically similar to performing a Fourier transform and the image on the back focal plane of an objective is the Fourier transform of the focal plane.

Figure 8:
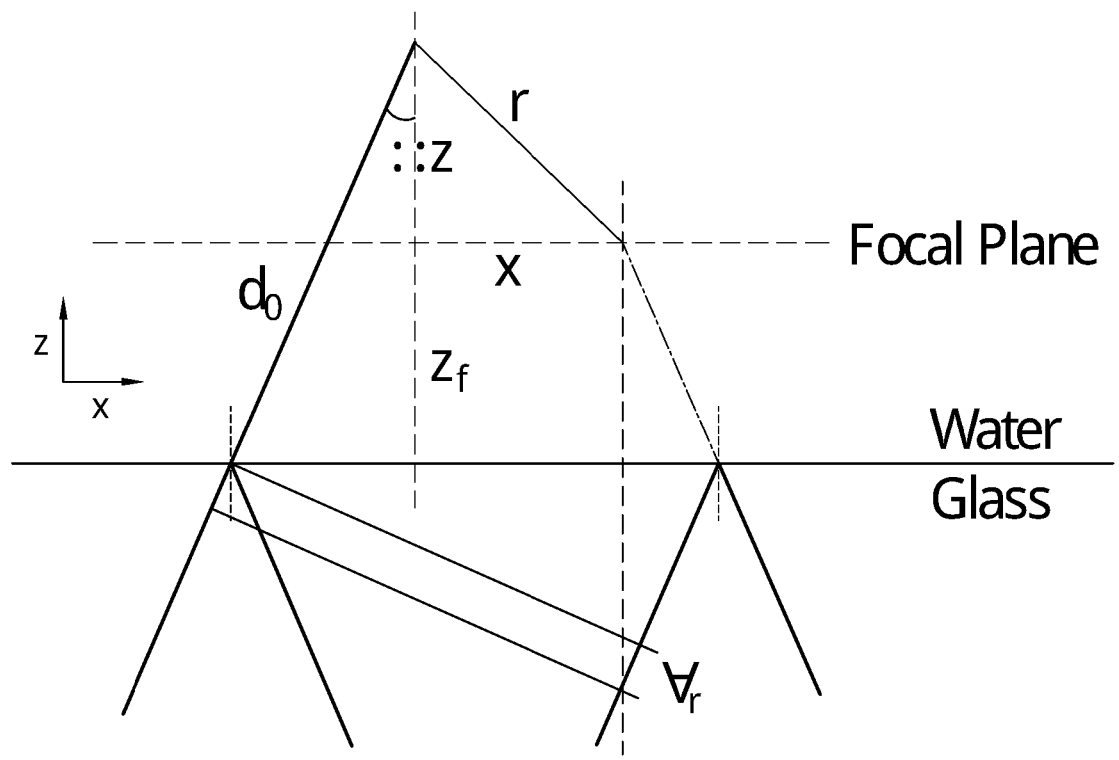
FIG. 8 shows optical geometry relating to hologram generation.

FIG. 8 shows optical geometry relating to hologram generation. The "Glass" region is assumed to have a reflective index equal to the water, so that the relevant lengths can be compared; this does not apply if the focal plane is below the interface.

Referring to FIG. 8 the interference image is created by the difference in path between the reflected and scattered light. The optical system (e.g. lens 128) is assumed to be relaying the magnified hologram to the camera. The scattered light travels a distance d0 from the glass-water interface to the particle, and a distance r from the particle to the focal plane. The reflected light does not cross the focal plane but the reflection appears to be coming from the focal plane, at a distance $\Delta_r$, which is negative for small $\theta_w$ angles, where $\theta_w$ is the angle in water. Here it is assumed that the coherence length is large enough for parallel rays to have the same phase. The path difference is $\Delta \equiv \Delta_s - \Delta_r \equiv d0 + r - \Delta_r$. The geometry gives, for the reflected path distance:

$$-\Delta_r = \frac{2f}{\cos\theta_m} - \sin\theta_w [x + \tan\theta_w(z + 2z_f)]$$

where $z_f$ is the distance of the focal plane of the objective from the reflecting interface and z is the distance of the particle from the focal plane. Then for the scattered path difference:

$$\Delta_s = \frac{z + z_f}{\cos\theta_w} + \sqrt{x^2 + y^2 + z^2}.$$

Thus the path length difference is:

$$\Delta = r + (z + 2z_f)\cos\theta_w - x \sin\theta_w$$

and by defining d as:

$$d \equiv \frac{\Delta}{\cos\theta_w} - (z + 2z_f)$$

this can be rewritten as:

$$\frac{(x - d\tan\theta_w)^2}{A^2} + \frac{y^2}{B^2} = 1$$

with $$B^2 \equiv d^2 - z^2; \quad A^2 \equiv \frac{B^2}{\cos^2\theta_w}.$$

This defines an interference image or hologram which an ellipse of eccentricity $e = |\sin \theta_w|$ centered around (x, y)=(d tan $\theta_w$, 0). The innermost ellipse is centered around the smallest possible value of Δ, which corresponds to x=|z|tan $\theta_w$. This is where the light would come if it was reflected by the particle. From the equation for $P_{col}$ the normalized hologram is found to be:

$$H = 1 + 2\frac{|s|}{|r|}\cos\phi$$

where $\phi = k\Delta$ and $$k = \frac{2\pi n_m}{\lambda}$$

and $|s|^2$ is given by the Rayleigh scattering equation above. The intensity should be integrated over a pixel:

$$I_{px} \propto r \iint_{px} d\Omega \sqrt{1+\cos^2\theta_w} \approx r\delta\Omega\sqrt{1+\cos^2\theta_w}$$

where the solid angle of the pixel is given by:

$$\delta\Omega \approx \left[2\arctan\left(\frac{\delta x\sqrt{|z|/r}}{2r}\right)\right]^2 \text{ and}$$

$$\lim_{(x,y,z)\to(0,0,0)} \delta\Omega = \pi^2 \text{ and } \lim_{r\to\infty} \delta\Omega = \frac{\delta x^2}{2}\frac{|z|}{r}.$$

The hologram spatial frequencies are led by the cos $\phi$ term, with $$\phi = \frac{2\pi(r - ax)n_m}{\lambda} + C.$$

In a case where $z=0$, x, y, and r are linked by $x = r\cos\theta$, $y = r\sin\theta$.

The Fourier transform of:

$$f(r,\theta) = \cos(2\pi r(1 - a\cos\theta)n_m/\lambda + C)$$

comprises two rings with radius $$\frac{n_m}{\lambda}$$

and center $\pm\sin\theta_w n_m/\lambda$. If $z\neq 0$ the frequencies will be located inside the circle.

The numerical aperture (NA) is a property of the objective lens and describes the maximum incidence angle $\theta_{max}$ in a medium with refraction index n that is accepted by the objective. It is given by $NA = n\sin\theta_{max}$ and is related to the maximum resolvable frequency by the Abbe diffraction limit $$f_{max,Abbe} = \frac{2NA}{\lambda}.$$

This can be used to compute the useful pixel size (px) as the maximum frequency that can be resolved as $$f_{max,px} = \frac{1}{2px}$$

and the pixel size should therefore be smaller than $$px < \frac{\lambda}{4NA}.$$

To detect the Fourier circle described above the numerical aperture should be such that $$\frac{n(1+\sin\theta)}{\lambda} < f_{max,Abbe}$$

and hence $$NA > n\frac{1+\sin\theta}{2}.$$

Applications

Applications of the described systems include locating and/or tracking one or more particles.

For example, by fitting a captured interference image to the above equation for an elliptical hologram a depth or 3D position of the particle may be determined from a distance of a particle from the focal plane of the objective lens and/or from the reflecting interface (distance z above).

In another application a particle may be tracked in one, two or three dimensions, in which case the camera may be a video camera. This can allow a particle to be characterized by determining a diffusion coefficient for the particle, which depends on an effective or hydrodynamic size of the particle. The diffusion coefficient depends on the mean square displacement of a particle per unit time.

In some implementations a particle may be confined in the z-direction, e.g. in a microfluidic channel. This can help particles to be more frequently found on or crossing the focal plane of the objective, where the signal is highest.

Image processing may be used to enhance the signal, e.g. by averaging interference image frames to determine a background which is subtracted. Since the signal arises from interference, after such subtraction the signal may be positive or negative, which should be taken into account if averaging. For example the signal may be averaged over a time less than a time during which is travels a quarter wavelength in the z-direction. Where background subtraction is employed a static e.g. bound particle may be detected by moving the channel/chamber on which the particle is bound.

In general it is desirable to minimize vibrations e.g. using an anti-vibration table, as these move the interference patterns and can wash out the signal.

The boundary of the chamber or channel defining the interface is typically an inner boundary of the channel/chamber i.e. an interface with the solution. In principle, however, it could be an exterior boundary of the channel/chamber. In principle the interface could be curved in which case the coherent light would illuminate the particle at an oblique angle to a plane tangent to the interface at the point of illumination. In principle the illumination could be near or at an absorption edge of an imaged particle.

Many alternatives will occur to the skilled person. The invention is not limited to the described embodiments and encompasses modifications apparent to those skilled in the art lying within the scope of the claims appended hereto.

The invention claimed is:

1. A method of increasing the signal contrast in interferometric scattering optical microscopy, the method comprising:
   providing a particle detection region having a boundary defined by an interface;
   illuminating a particle in the particle detection region with coherent light using an objective lens such that the light is reflected from the interface and scattered by the particle;
   capturing the reflected light and the scattered light using the objective lens;
   selectively attenuating the captured reflected light using a spatial filter; and
   providing the selectively attenuated captured reflected light and the captured scattered light to an imaging device to image interference between the reflected light and the scattered light;
   wherein the objective lens has an optical axis, the method further comprising
   providing the coherent light to the objective lens offset from the optical axis of the objective lens such that the coherent light illuminating the particle is at an oblique angle to the interface,
   wherein the spatial filter is an off-axis spatial filter at or adjacent a Fourier plane of the objective lens, and is configured to selectively mask a region of the Fourier plane offset from the optical axis in an opposite direction to the offset from the optical axis of the optical path of the coherent light to the objective lens.

2. A method as claimed in claim 1 further comprising linearly polarizing the coherent light illuminating the particle such that the coherent light illuminating the particle is partially or completely p-polarized with respect to a plane of incidence of the coherent light on the interface.

3. A method as claimed in claim 1 wherein the oblique angle defines substantially Brewster's angle for the coherent light at the interface.

4. A method as claimed in claim 1, further comprising adjusting the oblique angle to maximize a signal-to-noise ratio of the interference between the reflected light and the scattered light.

5. A method as claimed in claim 1 comprising providing the particle in solution and using a chamber or channel with a pair of opposite boundaries configured to restrict motion of the particle in a direction along the optical axis to a distance less than 3/2λ, λ, or λ/2, where λ is the wavelength of the coherent light.

6. A method as claimed in claim 1 wherein the particle comprises a biological molecule in aqueous solution.

7. A method as claimed in claim 1 further comprising processing the imaged interference to determine a difference between the imaged interference at two different times, and Fourier transforming the difference to characterize the particle or a solution of the particles.

8. A method as claimed in claim 1, wherein the spatial filter is located at or adjacent a back focal plane of the objective lens or at a focal plane of the coherent light, and is configured to mask a region located at the focus of a reflection of the coherent light from the interface.

9. A method as claimed in claim 1, wherein a rear surface of the objective lens is curved.

10. An interferometric scattering optical microscope, the microscope comprising:
    a particle detection region having a boundary defined by an interface;
    a source of coherent light;
    an objective lens to direct the coherent light to illuminate a particle in the particle detection region such that the light is reflected from the interface and scattered by the particle;
    wherein the objective lens has an optical axis and is configured to capture the reflected light and the scattered light;
    a spatial filter configured to selectively attenuate the captured reflected light; and
    an imaging device configured to receive the selectively attenuated captured reflected light and the captured scattered light to image interference between the reflected light and the scattered light; wherein
    an optical path of the coherent light to the objective lens is offset from the optical axis of the objective lens such that the coherent light illuminating the particle is at an oblique angle to the interface, and
    the spatial filter is an off-axis spatial filter at or adjacent a Fourier plane of the objective lens, and is configured to selectively mask a region of the Fourier plane offset from the optical axis in an opposite direction to the offset from the optical axis of the optical path of the coherent light to the objective lens.

11. A microscope as claimed in claim 10 wherein the source of coherent light is linearly polarized such that the coherent light illuminating the particle is partially or completely p-polarized with respect to a plane of incidence of the coherent light on the interface.

12. A microscope as claimed in claim 10 wherein the coherent light illuminating the particle at an oblique angle comprises a collimated beam of coherent light, and wherein the coherent light provided to the objective lens is focused at a back focal plane of the objective lens.

13. A microscope as claimed in claim 10 wherein an angle of incidence of the coherent light at the interface is between i) an angle value at which, at the imaging device, an intensity of the reflected light is greater than an intensity of light reflected from a back surface of the objective lens, and ii) the angle value plus 10 degrees.

14. A microscope as claimed in claim 10 wherein the spatial filter is located at or adjacent a back focal plane of the objective lens or at a focal plane of the coherent light, and is configured to mask a region located at the focus of a reflection of the coherent light from the interface.

15. A microscope as claimed in claim 10 wherein the coherent light is polarized, and an analyser with an orthogonal polarization is provided in an optical path between the particle and the imaging device.

16. A microscope as claimed in claim 10 further comprising a processor to process the imaged interference to determine a difference between the imaged interference at two different times, and to Fourier transform the difference to characterize the particle or a solution of the particles.

17. A microscope as claimed in claim 10 wherein a rear surface of the objective lens is curved.

18. A microscope as claimed in claim 10 wherein the particle detection region comprises a chamber or channel.

* * * * *